Figures 1, 2:
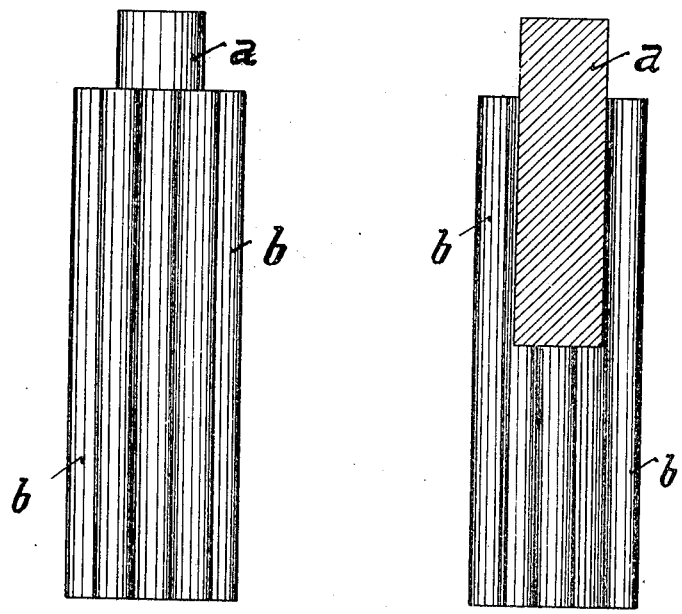

No. 870,985. PATENTED NOV. 12, 1907.
W. MÖLLENBRUCK & W. DIELMANN.
CARBON ELECTRODE FOR GALVANIC ELEMENTS.
APPLICATION FILED OCT. 23, 1906.

UNITED STATES PATENT OFFICE.

WILHELM MÖLLENBRUCK AND WILHELM DIELMANN, OF DUSSELDORF, GERMANY, ASSIGNORS TO HERMANN PELTZER, OF DUSSELDORF, GERMANY.

CARBON ELECTRODE FOR GALVANIC ELEMENTS.

No. 870,985.

Specification of Letters Patent.

Patented Nov. 12, 1907.

Application filed October 23, 1906. Serial No. 340,177.

*To all whom it may concern:*

Be it known that we, WILHELM MÖLLENBRUCK and WILHELM DIELMANN, citizens of Prussia, and residents of Dusseldorf, Germany, have invented certain new and useful Improvements in Carbon Electrodes for Galvanic Elements, of which the following is a specification.

Hitherto with galvanic elements furnished with carbon conductors there has existed a great drawback, for, in transport, the positive conductor, which consists of a solid rod of carbon, or of a carbon cylinder closed at the top, in direct touch with the depolarizing substance, can very easily be broken off as the result of a fall or a knock, in which event the whole element is worthless, it being impossible to renew the broken part without disturbing the entire arrangement of the cell.

The subject of this application is a carbon electrode that claims the advantage of possessing a carbon conductor which, if broken, can be instantly replaced by a new one, and so guarantees the immediate restoration of the element. This electrode consists of a number of carbon rods (*b*) circularly grouped, or of an ordinary carbon cylinder, or of one composed of flat carbon rings placed one on top of another, a central cavity (*y*) thus being formed from end to end. In this cavity (*y*) a removable carbon contact-rod (*a*) is arranged, which presses closely against the carbon rods (*b*), likewise transmitting contact, or against the inner wall of the carbon cylinder. The rods (*b*), or the cylinder, or the carbon rings, therefore form the fixed part connected with the depolarizing substance, while the removable carbon-rod (*a*), protruding from the element, is the only movable part and the one exposed to breakage, in which case it is easily renewed. Further, by the application of this removable carbon contact-rod (*a*) for dry cells, the possibility is offered, not only to effect a revivification of the cells when they become too dry, but also to produce filling—or reserve-elements without any special filling contrivance because the carbon conductor acts as plug to the injection-orifice, which is opened by taking out the conductor. Some further important, technical advantages of the construction of our electrode are the following:—The electrode, consisting of two parts, viz. a group of carbon rods placed together in circular form, or a carbon cylinder, or flat carbon rings placed on top of one another, and an exchangeable carbon conductor, in conjunction with the cavity in the electrode, prevents the concentration of the depolarizing liquids of a dry element from the interior to the exterior. Reversely, the construction of this electrode, in consequence of the law of gravity, effects the concentration of these liquids from the outside to the inside, and causes their deposit on the carbon surface, where they are constantly regenerated by the continuous entrance of atmospheric air, whereby the vitality of the elements furnished with this electrode is considerably increased. Moreover, owing to the presence of the cavity in the electrode an easier removal of the gas from the depolarizing substance is brought about, and with it a great constancy is secured. The passages in the electrode allow the atmospheric air to enter the inner cavity to supplement the oxygen consumed, as well as to remove the hydrogen gas bubbles from the electrode. This cavity also renders it possible to take up the water formed in the element so that a swelling-up of the filling composition cannot take place. Whereas with the elements hitherto used the obtainment of a large carbon surface was associated with a rather heavy expenditure, it can be done with this electrode in a much cheaper way by employing in the carbon group many carbon rods or rings. The large carbon surface is advantageous on account of its materially diminishing the inner resistance of the elements.

Figures 3, 4:
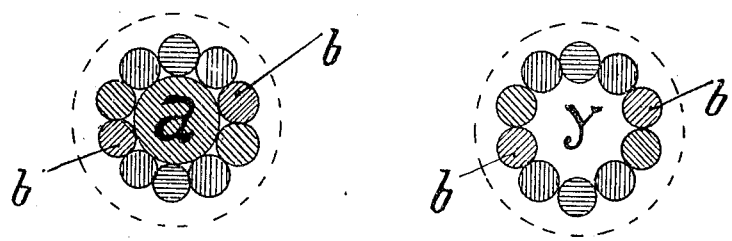

In the drawing filed with the provisional specification. Figure 1 shows the front view of the carbon electrode, Fig. 2 the longitudinal section of it, Fig. 3 a transverse section of the top, and Fig. 4 a transverse section of the bottom of same.

Having now particularly described and ascertained the nature of the said invention, and in what manner the same is to be performed, we declare that what we claim is:

A carbon electrode for dry batteries composed of circularly grouped carbon members firmly embedded into the ordinary depolarizing matter, and forming a central cavity, and of a removable carbon contact plug adapted to fit into said cavity and to come in close contact with said carbon members, substantially as described and for the purpose set forth.

In testimony whereof we affix our signatures.

WILHELM MÖLLENBRUCK.
WILHELM DIELMANN.

In the presence of—
OSKAR KÜNZELL,
ALFRED POHLMEYER.